No. 754,838. PATENTED MAR. 15, 1904.
J. F. BATES.
TANK AND HEATER.
APPLICATION FILED MAY 7, 1903.
NO MODEL.

Witnesses
E. F. Stewart
Wm. Bagger

J. F. Bates, Inventor.
by C. A. Snow & Co.
Attorneys

No. 754,838. Patented March 15, 1904.

UNITED STATES PATENT OFFICE.

JOEL F. BATES, OF URBANA, OHIO.

TANK AND HEATER.

SPECIFICATION forming part of Letters Patent No. 754,838, dated March 15, 1904.

Application filed May 7, 1903. Serial No. 156,085. (No model.)

*To all whom it may concern:*

Be it known that I, JOEL F. BATES, a citizen of the United States, residing at Urbana, in the county of Champaign and State of Ohio, have invented a new and useful Tank and Heater, of which the following is a specification.

This invention relates to tanks or troughs for watering stock and for other purposes; and it has for its object to provide a device of this class which may be constructed at a very moderate expense, which shall be practically indestructible, and which shall be provided with a heater attachment whereby the water contained in the tank or trough may be quickly and inexpensively heated to prevent it from freezing in cold weather and also to maintain its temperature at any desired degree.

With these ends in view my invention consists in a tank manufactured from cement, which possesses the elements of inexpensiveness and durability, and in the combination with said tank of a heater attachment by means of which the contents of the tank or trough may be easily and quickly heated at trifling expense of fuel and with little trouble.

The invention further consists in the detailed construction, arrangement, and combination of parts, which will be hereinafter fully described, and particularly pointed out in the claims.

Figure 1:
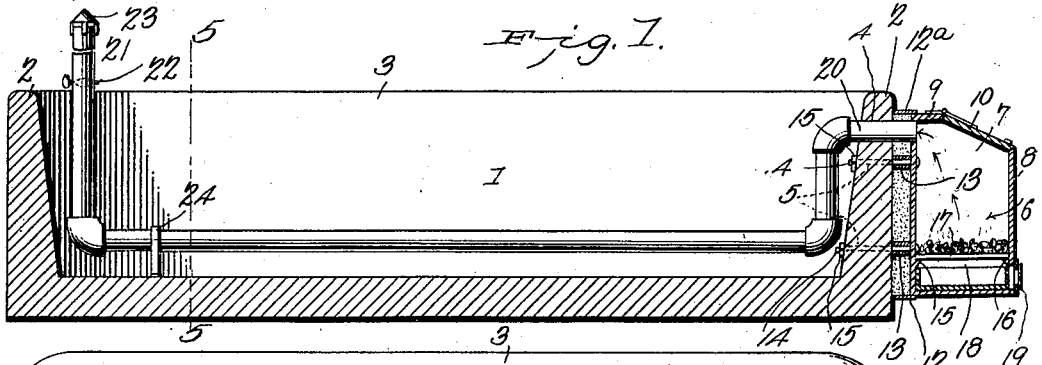
Figure 2:
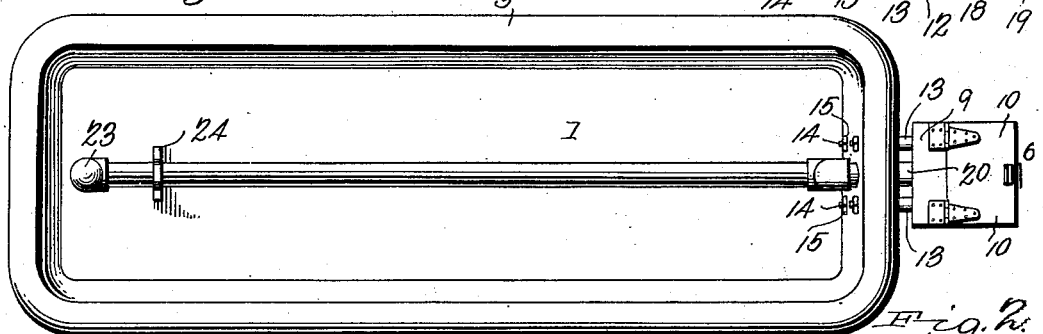
Figure 3:
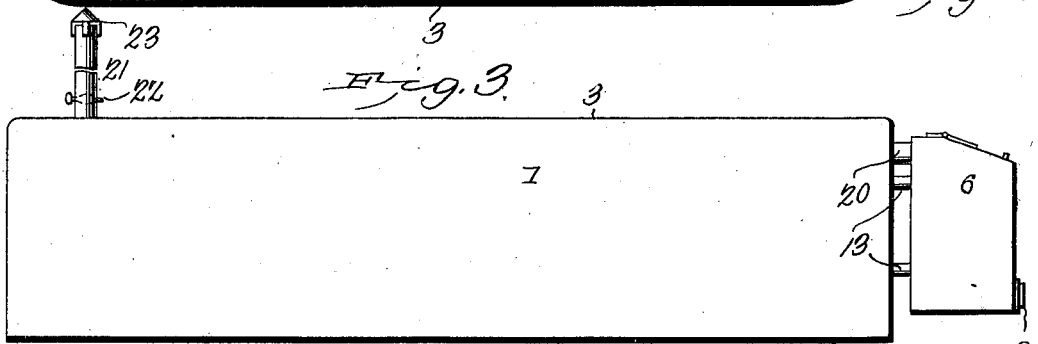
Figures 4, 5:
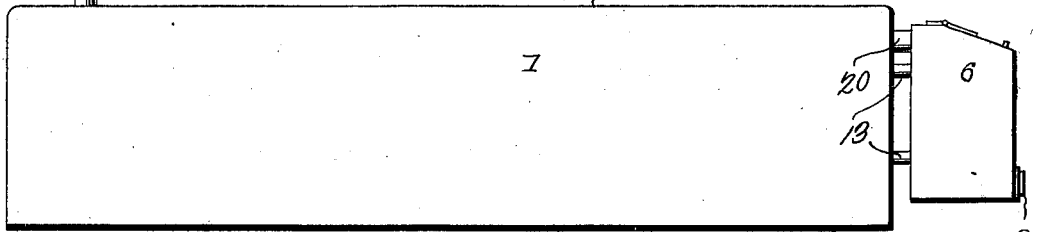

In the accompanying drawings, Figure 1 is a sectional elevation of a water trough and heater constructed in accordance with the principles of my invention. Fig. 2 is a top plan view of the same. Fig. 3 is a side elevation. Fig. 4 is a front end elevation. Fig. 5 is a transverse sectional view taken on the line 5 5 in Fig. 1.

Corresponding parts in the several figures are indicated by similar numerals of reference.

In carrying out my invention I construct a trough or tank 1, the material employed in the construction of the same being preferably a mixture of what is known as "German" Portland cement with sand or some other suitable filling medium. This tank is preferably molded in an elongated approximately rectangular shape with rounded corners, as clearly seen in Fig. 2 of the drawings. As regards the dimensions of the trough or tank I do not in any wise limit myself. By preference, however, the side and end walls 2 and 3 of the tank are tapered upwardly upon their inner sides for the obvious purpose of securing the greatest strength where it is most needed. One of the end walls 2 of the tank is provided near its upper end with an opening 4, and it is likewise provided with suitably-disposed perforations 5 5, the purpose of which will be presently set forth.

The heater used in connection with my improved tank consists of a casing 6, which may be manufactured either of sheet or cast iron or of a cast-iron back with sheet-metal sides and ends. This casing comprises a back plate 12, side pieces 7 7, a front piece 8, and a top flange 9, projecting from the back plate, to which is hingedly connected the lid or door 10, which is downwardly inclined, so as to be supported upon the upper edge of the front piece 8 and upon the inclined upper edges of the side pieces 7. The back of the casing is provided with perforations to receive bolts 14, that extend through the openings 5 in the tank and are secured by means of nuts 15, spacing-sleeves 13 being mounted upon the bolts between the tank and the back of the casing, so as to form an intermediate space whereby the tank shall be protected from the extreme heat of the heater-casing. In Fig. 1 of the drawings I have shown this intermediate space as being surrounded by a flange 12ª, forming a chamber which may be backed with asbestos or some other suitable non-conducting material, whereby the end of the cement tank shall be protected from the direct influence of the heat, which would be liable to cause it to crumble. In the remaining figures of the drawings the intervening space has been shown open for the circulation of air, which will usually be found sufficient for the protection of the tank.

The heater-casing is provided with interiorly-disposed lugs 16, adapted to support a grate 17, through which the ashes may escape into the ash-pit 18. The latter is provided at its front side with a door 19, having a damper 19' for the admission of draft. The upper portion of the heater-casing is in alinement with the opening 4 in the front end of the tank to which the said heater-casing is bolted, as described. To the inner side of this opening is connected a flue 20 for the exit of the products of combustion which are conveyed through said flue to the exit thereof 21, which is provided with a damper 22 and with a cap or cowl 23. This flue extends through the tank near the bottom thereof, and it is to be understood that it may be provided within said tank with any desired number of return-bends, whereby the passage provided for the products of combustion shall be lengthened, so that all the heat derived from the combustion of fuel in the heater-casing may be utilized. The tank is provided with supports 24, whereby the said flue is slightly raised from the bottom thereof.

The operation of this invention and the advantages thereof will be readily understood from the foregoing description, taken in connection with the drawings hereto annexed. The tank, it will be seen, may be constructed at an extremely moderate expense, and the heater likewise is of the simplest possible nature and is thoroughly efficient for the purposes for which it is intended.

I desire it to be understood that while I have herein described a simple and preferred form of my invention I do not thereby limit myself to the precise structural details herein set forth, but reserve the right to any changes, alterations, and modifications which may be resorted to within the scope of my invention and without departing from the spirit or sacrificing the utility of the same.

Having thus described my invention, I claim—

1. The combination of a cement tank, a heater-casing secured thereto, intermediate spacing means, and a non-conducting packing in the intermediate space thus formed to prevent the crumbling of the cement by the intensity of the heat in the casing.

2. The combination of a cement tank, a heater-casing connected with and spaced from the same, said casing having a hinged lid, a grate, an ash-pit and a front door having a damper, a flange inclosing the space between the rear wall of the heater-casing and the adjacent end of the tank, and non-conducting material packed in said space.

In testimony that I claim the foregoing as my own I have hereto affixed my signature in the presence of two witnesses.

JOEL F. BATES.

Witnesses:
R. W. PICKERING,
G. W. PICKERING.